UNITED STATES PATENT OFFICE.

RUSSELL E. PELOT, IRVIN B. PELOT, AND WILLIAM D. PELOT, OF NORFOLK, VIRGINIA, ASSIGNORS TO MOIST PROOF PRESSED BRICK COMPANY, INC., OF NORFOLK, VIRGINIA.

COMPOUND FOR MAKING ARTIFICIAL-STONE BUILDING BRICKS OR BLOCKS.

964,544. Specification of Letters Patent. Patented July 19, 1910.

No Drawing. Application filed August 7, 1909. Serial No. 511,776.

*To all whom it may concern:*

Be it known that we, RUSSELL E. PELOT, IRVIN B. PELOT, and WILLIAM D. PELOT, citizens of the United States, residing at Norfolk, in the county of Norfolk and State of Virginia, have invented certain new and useful Improvements in Compounds for Making Artificial - Stone Building Bricks or Blocks, of which the following is a specification.

This invention relates to a compound for making artificial stone building bricks or blocks.

The invention consists in combining the following ingredients in substantially the proportions stated:—

| | |
|---|---|
| Maumee | $\tfrac{1}{3}$ oz. |
| Cement | $\tfrac{3}{4}$ lbs. |
| Pulverized clay | $\tfrac{3}{4}$ lbs. |
| Pulverized sand | $3\tfrac{1}{2}$ lbs. | sufficient slack lime water being added to form a plastic mass, and the latter being shaped in suitable molds to form the bricks or blocks.

In carrying out the invention the cement and maumee are placed in a suitable receptacle and thoroughly mixed, after which the pulverized clay is added to the mixture and the latter again stirred or agitated until the parts are well blended. To the mixture thus formed is added three and one-half pounds of high grade sand, preferably pulverized, and sufficient slaked lime water to form a plastic mass of the desired consistency. The compound thus formed is placed in suitable molds and subjected to hydraulic or other pressure approximately 3,500 pounds to the square inch to thoroughly compress the mixture and render the same homogeneous and of uniform density throughout its entire area. The bricks or blocks are then removed from the molds and cured by the water process, which process consists in spraying the bricks or blocks with liquid for approximately twenty-four hours after leaving the press.

After being thoroughly cured in the manner stated the bricks or blocks are placed in a kiln and subjected to the action of steam having a pressure of approximately ten pounds to the square inch, and allowed to remain in the kiln under the influence of the steam for approximately ten days, when the same are removed and ready for use.

The slaked lime water prevents the cement from setting too rapidly and also allows the mixture to absorb moisture when subjected to the action of a liquid spray, while the maumee acts as a binder and assists in preventing disintegration of the blocks. Maumee is a trade name applied to a white powder consisting of lime soap 19.59%, carbonate of lime 52.55%, oxid of lime (caustic) 13.86%, magnesia 12.29% and foreign matter 1.71%. These proportions may be varied at will. Maumee when mixed with the other ingredients forming the compound not only acts as a binder but also renders the bricks or blocks water proof.

A building brick or block formed of the compound in the manner stated will successfully withstand enormous crushing pressure, and being absolutely frost and moisture proof is particularly desirable in the construction of walls, partitions, floors, and other portions of a building.

Owing to the moisture proof qualities of the mixture constituting the brick or block, the usual stripping or lathing secured to the walls of a building preparatory to plastering may also be dispensed with.

Having thus described the invention what is claimed as new is:—

1. A compound for making artificial stone bricks or blocks consisting of cement, clay, sand, maumee and sufficient lime water to form a plastic mass.

2. A compound for making artificial stone bricks or blocks consisting of cement, three-fourths pounds, clay three-fourths pounds, sand three and one-half pounds, maumee one-third ounce, and sufficient slaked lime water to form a plastic mass.

3. A compound for making artificial stone bricks or blocks, consisting of cement three-fourths pounds, pulverized clay three-fourths pounds, high grade pulverized sand three and one-half pounds, maumee one-third ounce, and sufficient slaked lime water to form a plastic mass.

4. A compound for making artificial stone bricks or blocks consisting of cement, clay, sand and maumee.

5. A compound for making artificial stone bricks or blocks consisting of cement, clay, sand, maumee and sufficient water to make a plastic mass.

In testimony whereof we affix our signatures in presence of two witnesses.

RUSSELL E. PELOT. [L. S.]
IRVIN B. PELOT. [L. S.]
WILLIAM D. PELOT. [L. S.]

Witnesses:
　J. W. PAYNE,
　C. B. TISDALE.